United States Patent [19]

Siraky

[11] Patent Number: 5,744,706
[45] Date of Patent: Apr. 28, 1998

[54] DEVICE FOR MEASURING THE ANGLE OF TWIST

[75] Inventor: Josef Siraky, Donaueschingen, Germany

[73] Assignee: Max Stegmann GmbH Antriebstechnik-Elektronik, Donaueschingen, Germany

[21] Appl. No.: 565,913

[22] Filed: Dec. 1, 1995

[30] Foreign Application Priority Data

Dec. 23, 1994 [DE] Germany ............... 44 46 243.3

[51] Int. Cl.⁶ ..................................................... G01B 3/00
[52] U.S. Cl. ......................... 73/116; 33/1 PT; 73/431
[58] Field of Search ........................... 73/527, 118.1, 73/118.2, 431, 116; 277/88, 89, 212, 212 F, 212 FB; 310/88; 74/17.8, 18; 324/207.25; 33/1 PT

[56] References Cited

U.S. PATENT DOCUMENTS

| | | | |
|---|---|---|---|
| 2,509,227 | 5/1950 | Gordy | 74/18 |
| 2,742,790 | 4/1956 | Nelson | 74/17.8 |
| 2,837,926 | 6/1958 | Korsgren, Sr. et al. | 74/17.8 |
| 3,011,815 | 12/1961 | Guite | 277/212 |
| 3,310,693 | 3/1967 | Aronoff | 74/17.8 |
| 3,612,851 | 10/1971 | Fowler | 73/431 |
| 3,688,523 | 9/1972 | Schafer | 277/212 FB |
| 3,868,521 | 2/1975 | Schlicker et al. | |
| 3,997,805 | 12/1976 | Dochterman | 277/90 |
| 4,243,232 | 1/1981 | Repella | 277/212 FB |
| 4,660,288 | 4/1987 | Dangschat | 33/1 PT |
| 4,732,396 | 3/1988 | Brigham et al. | 277/212 FB |
| 5,025,563 | 6/1991 | Rennerfelt | 33/1 PT |
| 5,382,098 | 1/1995 | Rigaux et al. | 324/207.25 |
| 5,657,544 | 8/1997 | Ota et al. | 33/1 PT |

FOREIGN PATENT DOCUMENTS

| | | | |
|---|---|---|---|
| 1220522 | 5/1960 | France | 73/431 |
| 55-014938 | 2/1980 | Japan . | |
| 62-207153 | 9/1987 | Japan . | |
| 5-147868 | 6/1993 | Japan . | |
| 2 117 572 | 1/1993 | United Kingdom . | |

*Primary Examiner*—Ronald L. Biegel
*Attorney, Agent, or Firm*—Gary M. Nath; Nath & Associates

[57] ABSTRACT

A device for measuring the angle of twist (20) is mounted to an electromotor (10). The housing (21) of the measuring device (20) is sealed from the housing (13) of the electromotor (10) by a sealing element (30). The sealing element is designed like a disk, is fixed by its outer circumference on the housing (21) and rests in a sealing manner by its inner circumference on the shaft (22) of the measuring device (20). The sealing element (30) can be at least partially deformed in a flexible manner so that it can yield to a pressure gradient between the motor housing (13) and the housing (21) of the measuring device.

14 Claims, 1 Drawing Sheet

DEVICE FOR MEASURING THE ANGLE OF TWIST

The invention is relative to a device for measuring the angle of twist [rotation] in accordance with the generic part of claim 1 which can be mounted on a motor.

Devices for measuring the angle of twist are preferably mounted on motors, especially electromotors [electric motors], in order to determine the angular position, the speed, etc. of the motor shaft for purposes of control and regulation.

When the device for measuring the angle of twist is mounted on the motor the problem occurs that dirt can penetrate into the housing of the measuring device and adversely effect the ability of the measuring device to function. The contamination is especially problematic in the case of measuring devices with optical scanning.

A seal which prevents the penetration of contaminated air into the housing of the measuring device was not possible before now. This is due to the fact that motors exhibit a high temperature difference between the operating state and the state of rest. For example, electromotors are operated at a winding [coil] temperature of up to 150° C. The high operating temperature elevates the air pressure in the motor housing so that the air charged with lubricant, dust and rubbed-off particles is pressed out of the motor housing via the shaft opening and its seal into the housing of the measuring device. During the cooling-off of the motor a vacuum [negative pressure, underpressure] is produced in the motor housing, as a result of which dust-charged air is again drawn by suction out of the environment into the motor housing. Thus, as a consequence of this "breathing" of the motor a certain amount of dirt-charged air is pumped out of the motor housing into the housing of the measuring device each time the motor is turned on.

DE 33 01 295 A teaches a device for measuring the angle of twist in which a stator part is rotatably mounted on the shaft of the measuring device by means of ball bearings which stator part carries the scanning for the angular position. This stator part is connected via a bellows coupling, which can yield axially and radially but is torsion-proof, to the housing of the measuring device. The bellows coupling does not seal off the housing of the measuring device since air can penetrate via the bearing of the stator part into the interior of the housing.

The invention has the problem of creating a device for measuring the angle of twist which is suitable for being mounted on a motor and which prevents the penetration of contaminated air out of the motor housing into the housing of the measuring device.

The invention solves this problem in a device for measuring the angle of twist of the initially mentioned type by the features of claim 1.

Advantageous embodiments of the invention are indicated in the subclaims.

The invention is based at first on the recognition that the previously described "breathing" of the motor constitutes a significant cause for the penetration of contaminated air into the housing of the measuring device. The penetration of air from the motor housing into the housing of the measuring device takes place in order to compensate the pressure difference between the motor housing and the housing of the measuring device caused by the high motor temperature. The invention is further based on the recognition that this pressure compensation can not be prevented by traditional shaft seals. Starting from this recognition, the basic concept of the invention is to close [seal] the housing of the measuring device by a flexibly deformable sealing element. This sealing element is deformed under the influence of the pressure difference between the motor housing and the housing of the measuring device. The deformation of the sealing element brings about an increase of the air volume of the motor housing and a decrease of the air volume of the housing of the measuring device until the same air pressure prevails on both sides of the sealing element, that is, in the motor housing and in the housing of the measuring device. The sealing element thus follows the breathing of the motor like a lung. Since no pressure difference can arise between the motor housing and the housing of the measuring device on account of the breathing movement of the sealing element no contaminated air passes either from the motor housing via the shaft seal of the sealing element into the housing of the measuring device.

The sealing element consists at least in its flexible partial areas preferably of a rubber-elastic material which can be designed with the required yielding deformability.

As regards the manufacturing costs, it is especially advantageous to manufacture the sealing element as a one-piece disk of the rubber-elastic material. The disk is preferably designed with concentric corrugations [undulations] following radially on each other. This yields on the one hand the necessary dimensional stability and angular rigidity of the disk and on the other hand a sufficient, flexible deformability, especially in axial direction, is assured.

In an advantageous embodiment the sealing element can be fixed by its outer circumferential edge between the motor housing and the housing of the measuring device. This assures on the one hand a reliable seal between the housing and the sealing element and on the other hand no additional fastening means are necessary for the sealing element which would render the manufacture and assembly more expensive.

Since no pressure gradient [drop] occurs between the motor housing and the housing of the measuring device, a sufficient sealing of the shaft is assured if the fixed sealing element rests by at least one sealing lip on the rotating shaft.

If the sealing element of the invention is used in a device for measuring the angle of twist in which a stator part is rotatably mounted on the shaft the sealing element can function at the same time as a radially and axially yielding, angularly rigid coupling for supporting the stator part on the housing. The stator part is fixed in a radially middle, annular area on the sealing element. The sealing element holds the stator part in the housing in such a manner that it can not rotate and the flexibility of the sealing element permits axial and radial movements of the stator part due to errors of alignment of the shaft. The radially inner area of the sealing element between the shaft and the fastening of the stator part executes the breathing function thereby for preventing a pressure gradient between the motor housing and the housing of the measuring device.

The invention is explained in detail in the following using an embodiment shown in the drawings.

FIG. 1 schematically shows an axial section of an electromotor with a device for measuring the angle of twist mounted on it.

Figure 1:
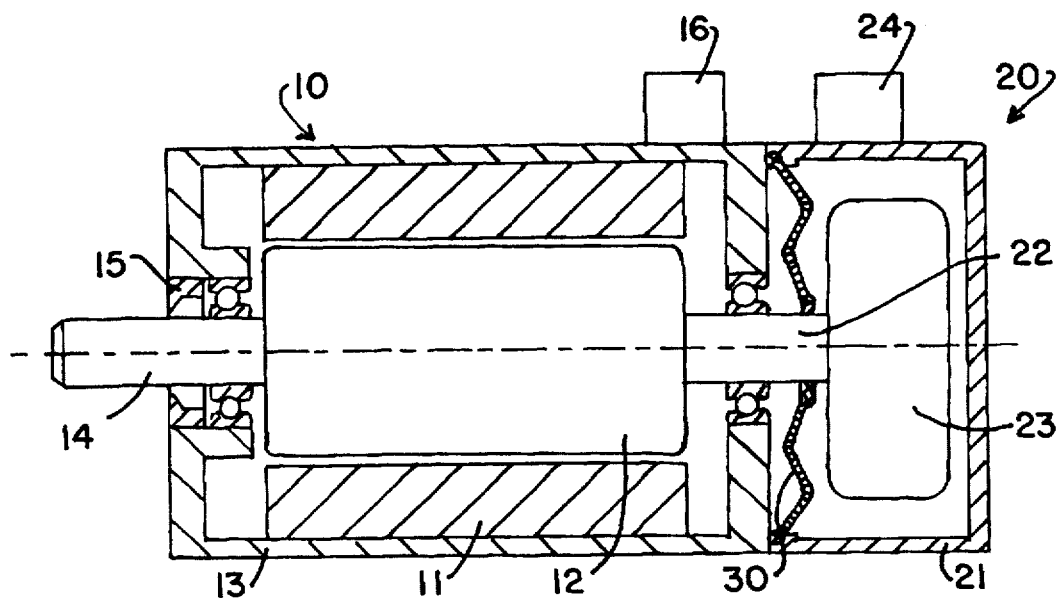
Figure 4:
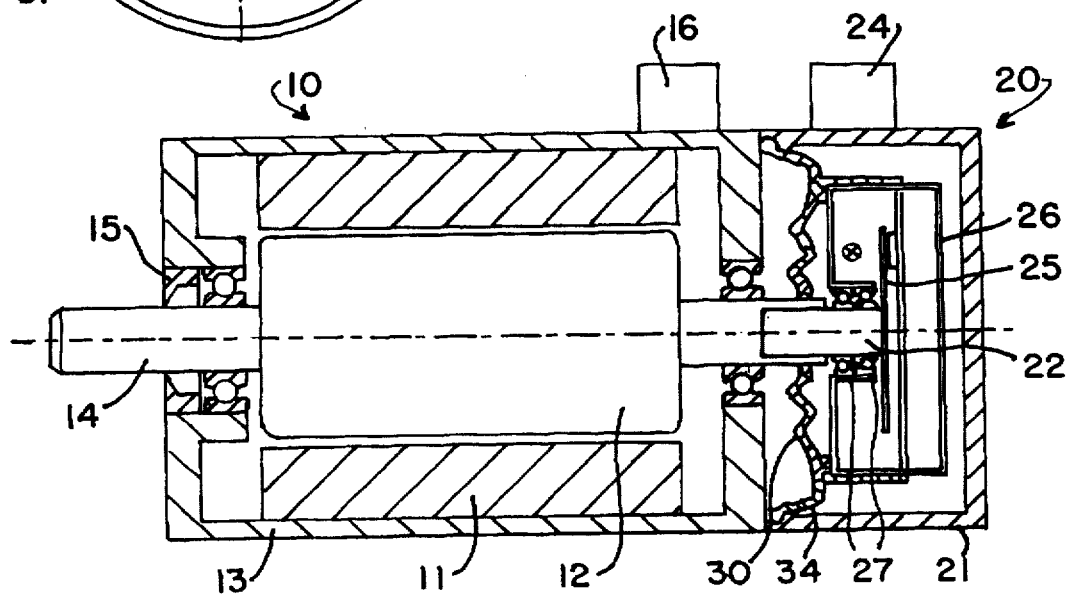

FIG. 4 schematically shows an axial section corresponding to FIG. 1 of a modified embodiment.

FIG. 1 schematically shows an embodiment of an electromotor 10 with stator 11, rotor 12 and motor housing 13. Rotor 12 sits on motor shaft 14 which is extended past shaft seal 15 out of motor housing 13. Electric connections 16 serve to feed and control electromotor 10.

Device for measuring the angle of twist (20) is mounted on electromotor 10 on the end opposite the output end of motor shaft 14. Measuring device 20 has pot-shaped housing 21 with is mounted by its open, axial front side to the facing, axial front side of motor housing 13. Measuring device 20 has a shaft 22 which is coupled to motor shaft 14 in axial alignment therewith or forms an extension of motor shaft 14. The angle of twist of shaft 22 is determined by a known scanning [i.e. scanning device] 23. Scanning 23 can be e.g. a stator part with an optical scanning which scans a disk with angle markings sitting on shaft 22. The measuring device is fed and the measured values read [read out] via electric connections 24.

Sealing element 30 is inserted between housing 21 of device for measuring the angle of twist (20) and between motor housing 13 of electromotor 10. This sealing element is fixed by its outer circumferential edge between housing 21 and motor housing 13 and rests by its inner circumferential edge in a sealing manner on shaft 22. Sealing element 30 is flexibly deformable at least in a partial area of its surface, so that it can yield to a pressure gradient between the interior of motor housing 13 and the interior of housing 21.

Figure 2:
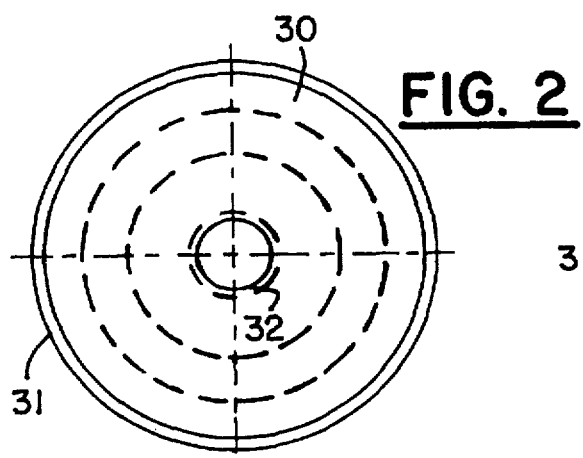
FIG. 2 shows a top view of the sealing element of the measuring device.
Figure 3:
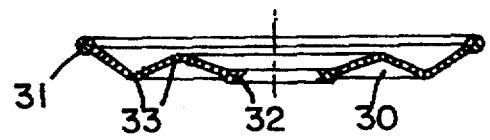
FIG. 3 shows an axial section of the sealing element.

FIGS. 2 and 3 show an embodiment of sealing element 30.

Sealing element 30 has the shape of a circular ring disk and is manufactured in one piece from a rubber-elastic material. Sealing element 30 comprises bead 31 on its outer circumference. Sealing element 30 is sealingly fixed in a positive [form-fit] manner by bead 31 between housing 21 and motor housing 13. To this end housing 21 extends over bead 31 with an appropriate recess. Sealing element 30 comprises an opening in its middle, the inner diameter of which corresponds to the outer diameter of shaft 22 and surrounds shaft 22 in a dimensionally stable manner. Sealing lips 32 (two sealing lips 32 in the embodiment shown) are formed on the inner circumference of the opening which lips run in a circumferential direction and rest under a slight pressure but low friction on shaft 22.

In the radial area between the opening and bead 31 sealing element 30 is corrugated with concentric peaks and valleys 33 of corrugations following each other in radial direction. As a result of the corrugated design and the material properties of the rubber-elastic material, sealing element 30 exhibits on the one hand a flexible deformability in axial direction and on the other hand a dimensional stability and stiffness against torsion in circumferential direction. The deformability of sealing element 30 in axial direction makes it possible for sealing element 30 to bulge out, so that it can yield to a pressure gradient between motor housing 13 and housing 21.

FIG. 4 shows a modified embodiment of the device for measuring the angle of twist.

In this embodiment rotor part 25, which is designed e.g. as a disk provided with angle information, is connected to and sits on shaft 22. Stator part 26, which carries the scanning for rotor part 25, is rotatably mounted on shaft 22 by means of ball bearings 27.

Stator part 26 is fixed on sealing element 30 and sealing element 30 forms the sole coupling between stator part 26 and housing 21. Sealing element 30 couples stator part 26 to housing 21 in a torsion-proof manner but allows axial and radial movements of stator part 26 on account of its flexible, elastic deformability. Stator part 26 can follow axial and radial movements of shaft 22 in this manner if errors of alignment occur between shaft 22 and motor shaft 14 when measuring device 20 is mounted on electromotor 10.

If sealing element 30 is designed in the form shown in FIGS. 2 and 3 stator part 26 is preferably fixed on an outer ring area 34 of sealing element 30. The deformability of sealing element 30 allows an axial and radial movement of shaft 22 with stator part 26 sitting on shaft 22. The inner area of sealing element 30 up to ring area 34 fastened to stator part 26 moves thereby together with shaft 22 and stator part 26 axially and radially. The radially outer area of sealing element 30 between the outer circumference fixed to housing 21 and [between] ring area 34 fixed to stator part 26 makes this axial and radial movement possible but holds stator part 26 angularly rigid and torsion-proof in relation to housing 21. The flexible deformation of sealing element 30 which compensates a pressure gradient preferably takes place in the radially inner area of sealing element 30 within ring area 34 fixed to stator part 26.

I claim:

1. In a device for measuring the angle of twist of a motor to which the measuring device is coupled, the device including a device housing, a device stator, and a device shaft and the motor including a motor housing and a motor shaft, the housing of the device being capable of being mounted on a housing of the motor, the improvement comprising a seal for sealing said device, said seal comprising:

a sealing element that is comprised of
 a circular ring disc fastened on its outer circumference to the housing of the device or of the motor and resting its inner circumference in a sealing manner on the shaft of the device or the shaft of the motor and capable of being axially and radially deformed at least in a partial area of its surface; and
 an outer ring area extending from said disc and connected to the device stator for coupling said device stator to the housing in an angularly rigid manner.

2. The improvement of a measuring device according to claim 1 wherein the sealing element is comprised of at least in its flexible partial area (33) of elastic material.

3. The improvement of a measuring device according to claim 2 wherein the sealing element is fixed by its outer circumferetial edge between the devise housing and between the motor housing (13).

4. The improvement of a measuring device according to claim 3 wherein the sealing element rests on its inner circumference with at least one sealing lip on the shaft.

5. The improvement of a measuring device according to claim 4 wherein the sealing element is a circular ring disk.

6. The improvement of a measuring device according to claim 5 wherein the sealing element is a one-piece disk of rubber-elastic material.

7. The improvement of a measuring device according to claim 3 wherein the sealing element is fixed is a sealing manner between the device housing and the motor housing by a bead on the outer circumference of said sealing element.

8. The improvement of a measuring device according to claim 7 wherein the ring has a thickness greater than the rest of the seal.

9. The improvement of a measuring device according to claim 8 wherein the motor is an electromotor.

10. The improvement of a measuring device according to claim 2 wherein the sealing element is a one-piece disk of rubber elastic material.

11. The improvement of a measuring device according to claim 10 wherein the disk has in concentric peaks and valleys of corrugations alternating in an undulating manner with each other in a radial direction.

12. The improvement of a measuring device according to claim 10 wherein the sealing element is fixed in a sealing and radially positive manner between the device housing and the motor housing by a bead on the outer circumference of said sealing element.

13. The improvement of a measuring device according to claim 1 wherein said device stator is rotatably mounted on said device shaft and is coupled to said device housing by said an outer ring area such that said device stator is connected in a torsion-proof manner to the sealing element in a concentric ring area thereof.

14. In a device for measuring the angle of twist coupled to a motor, the device including a stator, a device shaft capable of being coupled to a motor shaft and a device housing containing said stator and device shaft, said device housing being capable of being mounted to a motor housing, wherein the improvement comprises a sealing element comprising:

a flat laminar sealing element closing said device housing on the side nearest to the motor, said sealing element fastened on its outer circumference to the devise housing, said sealing element resting in a sealing manner on its inner circumference on said device shaft, said sealing element capable of being axially and radially deformed in at least a partial area of its surface in order to accommodate differences in pressure within and without said device housing; and an outer ring area extending from said sealing element for connecting to said stator and for coupling said stator to said device housing of said device in an angularly rigid manner.

* * * * *